US008928636B2

(12) United States Patent
Bang et al.

(10) Patent No.: US 8,928,636 B2
(45) Date of Patent: Jan. 6, 2015

(54) MAGNETIC TOUCH PEN

(71) Applicant: Samsung Display Co., Ltd., Yongin (KR)

(72) Inventors: Hyung-Sung Bang, Yongin (KR); Won-Jong Kim, Yongin (KR); Ji-Young Choung, Yongin (KR); Joon-Gu Lee, Yongin (KR); Jin-Baek Choi, Yongin (KR); Yeon-Hwa Lee, Yongin (KR); Young-Woo Song, Yongin (KR); Jong-Hyuk Lee, Yongin (KR)

(73) Assignee: Samsung Display Co., Ltd., Yongin (KR)

( * ) Notice: Subject to any disclaimer, the term of this patent is extended or adjusted under 35 U.S.C. 154(b) by 161 days.

(21) Appl. No.: 13/758,507

(22) Filed: Feb. 4, 2013

(65) Prior Publication Data

US 2014/0125637 A1 May 8, 2014

(30) Foreign Application Priority Data

Nov. 7, 2012 (KR) .......................... 10-2012-0125481

(51) Int. Cl.
*G06F 3/033* (2013.01)
*G06K 11/06* (2006.01)
*G06F 3/0354* (2013.01)

(52) U.S. Cl.
CPC ................................. *G06F 3/03545* (2013.01)
USPC ........................................ 345/179; 178/20.03

(58) Field of Classification Search
CPC ...... G06F 3/033; G06F 3/046; G06F 3/03545; G06F 2203/04108
USPC .......... 335/212, 285, 295, 302, 306; 345/173, 345/174, 179
See application file for complete search history.

(56) References Cited

U.S. PATENT DOCUMENTS 5,565,632 A * 10/1996 Ogawa ........................ 73/862.69
2004/0239652 A1 * 12/2004 Taylor et al. .................. 345/179

FOREIGN PATENT DOCUMENTS

JP 2010-257270 A 11/2010
KR 10-0726505 B1 6/2007

* cited by examiner

*Primary Examiner* — Kent Chang
*Assistant Examiner* — Mark Edwards
(74) *Attorney, Agent, or Firm* — Knobbe Martens Olson & Bear LLP

(57) ABSTRACT

A magnetic touch pen is disclosed. In one aspect, the magnetic touch pen comprises a first case in which a plurality of magnets is arranged in a cylindrical first body in a longitudinal direction of the first body. It also comprises a second case including a second body in which the first body of the first case is accommodated and having screw threads formed on an inner circumference of the second body. It further comprises a magnetic power controller configured between two magnet groups to separate the two magnet groups and moving along the screw threads of the second case to control a plurality of magnets of the two magnet groups.

13 Claims, 4 Drawing Sheets

MAGNETIC TOUCH PEN

CROSS-REFERENCE TO RELATED APPLICATION

This application claims priority to and the benefit of Korean Patent Application No. 10-2012-0125481, filed on Nov. 7, 2012, in the Korean Intellectual Property Office, the entire content of which is incorporated herein by reference.

BACKGROUND

1. Field of Technology

The described technology generally relates to a magnetic touch pen, and more particularly, to a magnetic touch pen in which magnets are mounted.

2. Description of the Related Technology

A touch screen panel is capable of selecting by finger or touch pen the indication content on the display screen so as to input user commands.

It is provided atop a display device to convert a contact position into an electrical signal. The selected content of the contact position is received as an input signal for further digital processing.

Because the touch screen panel may be used in place of an additional input device, such as a keyboard and a mouse, coupled to the image display device to operate, commercial use has seen widespread adoption. Therefore, the development of technologies related to the touch pen is also needed.

SUMMARY

One aspect is a magnetic touch pen configured to realize a plurality of touch modes.

Another aspect is a magnetic touch pen, comprising a first case in which a plurality of magnets are arranged in a cylindrical first body in a longitudinal direction of the first body, a second case including a second body in which the first body of the first case is accommodated and having screw threads formed on an inner circumference of the second body, and a magnetic power controller configured between the magnets divided into two groups to separate the two groups of magnets and moving along the screw threads of the second case to control the number of magnets that belong to the two groups.

In some embodiments, a sliding line for guiding movement of the magnetic power controller may be formed in the first body of the first case.

In some embodiments, the magnetic power controller may include screw thread protrusions that pass through the sliding line to protrude outside the second body and that are combined with the screw threads of the second body.

In some embodiments, the magnetic power controller may include cylindrical controlling bodies having a diameter through which the magnets may pass and locking jaws that are formed of a ductile material and formed on inner circumferences of the controlling bodies to prevent the magnets from flowing.

In some embodiments, the locking jaws may include at least one of urethane and plastic.

In some embodiments, the plurality of screw thread protrusions may be formed on outer circumferences of the controlling bodies.

In some embodiments, the sliding line may be a straight line or a curved line formed in the longitudinal direction of the first body.

In some embodiments, the first case may include a third body that covers the first body and the second body of the second case may be inserted between the first body and the third body.

In some embodiments, both ends of the second body of the second case may be fastened to both ends of the first case.

In some embodiments, the second case may include a grip extended to a part of an outer circumference of the third body while covering an end of the first case to provide a turning handle region of a user.

In some embodiments, the first case may include a touch tip in which a magnetic material is mounted.

In some embodiments, the magnets may be cylindrical.

In some embodiments, the magnets may have edges that form low angles.

As described above, according to the described technology, the magnets in which the magnetic power controller is mounted are divided into two groups to be separated from each other so that the magnitude of the magnetic power of the touch pen may be controlled. Therefore, a plurality of touch modes in accordance with the levels of the magnetic power may be provided.

In addition, since the magnets are arranged in the longitudinal direction, the side surface of the touch pen is configured to perform touch inputs of various methods.

DETAILED DESCRIPTION

Figure 1:
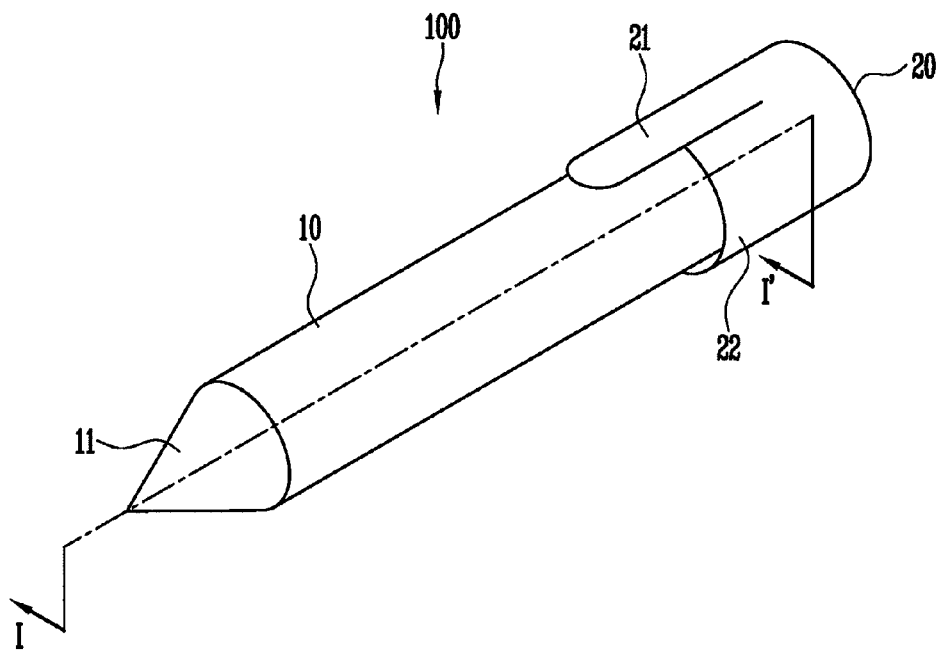
FIG. 1 is a perspective view schematically illustrating an example of a magnetic touch pen according to an embodiment.

In the following detailed description, only certain embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the element or be indirectly on the element with one or more intervening elements interposed therebetween. Also, when an element is referred to as being "connected to" another element, it can be directly connected to the element or be indirectly connected to the element with one or more intervening elements interposed therebetween. Hereinafter, the same reference numerals refer to the same or like elements.

Hereinafter, embodiments will be described in detail with reference to the accompanying drawings.

FIG. 1 is a perspective view schematically illustrating an example of a magnetic touch pen according to an embodiment.

Referring to FIG. 1, a magnetic touch pen 100 includes a first case 10 having a touch tip 11 at one end and a second case 20 combined with the first case 10.

In some embodiments, the first case 10 has a predetermined length and thickness so that a user may easily hold the first case 10. A cavity suitable for accommodating magnets may be provided in the first case 10. For example, the first case 10 may be cylindrical or rectangular and may have various shapes in accordance with the appearances of the magnets or the purpose of the touch pen.

A touch tip 11 that contacts a touch screen panel is a cone having a sharp end like a common pen.

The second case 20 is inserted into and combined with the other end of the first case 10 and may independently rotate while being combined with the first case 10.

In some embodiments, screw threads or a flange structure are formed in the parts where the first case 10 and the second case 20 are fastened to each other so that the first case 10 and the second case 20 may be easily combined with each other and may be easily released from each other.

In addition, the second case 20 may have a clip 21 formed to be inserted into a pocket of a user or a sheet of a book.

The second case 20 may include a grip 22 extended to a part of the outer circumference of the first case 10 to provide the turning handle region of the user.

In some embodiments, the magnetic touch pen 100 has a shape the same as that of a fountain pen. The first case 10 and the second case 20 may be formed of a material that may not affect magnetic power and may be formed of light fiber-reinforced plastic having high mechanical strength, corrosion resistance, and formability.

In some embodiments, the magnetic touch pen 100 may consist of three parts that may be attached to and detached from each other. Screw threads are formed in the parts where the parts are fastened to each other or the parts may be combined with each other by another flange structure that may be rotatably inserted.

The number of parts that consist of the magnetic touch pen 100, the shape of the parts, and a method of combining the parts with each other are exemplary and the present invention is not limited to the above.

The detailed structure of the magnetic touch pen 100 according to an embodiment will be described hereinafter with reference to FIGS. 2 and 3.

Figure 2:
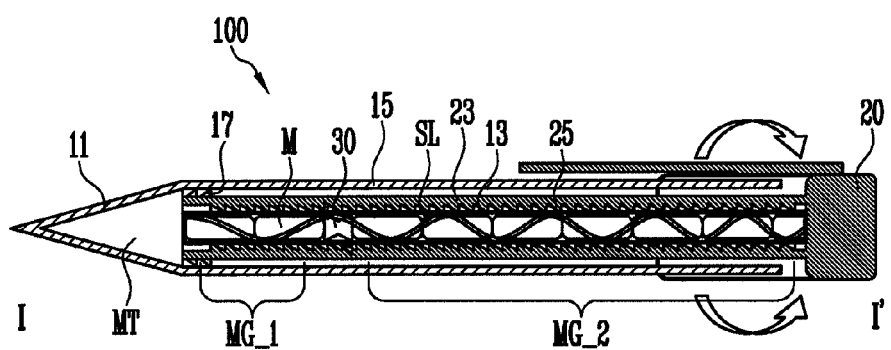
FIG. 2 is a sectional view of the magnetic touch pen taken along the line I-I' of FIG. 1.

FIG. 2 is a sectional view of the magnetic touch pen taken along the line I-I' of FIG. 1. FIG. 3 is an exploded sectional view of the magnetic touch pen of FIG. 2.

Figure 3:
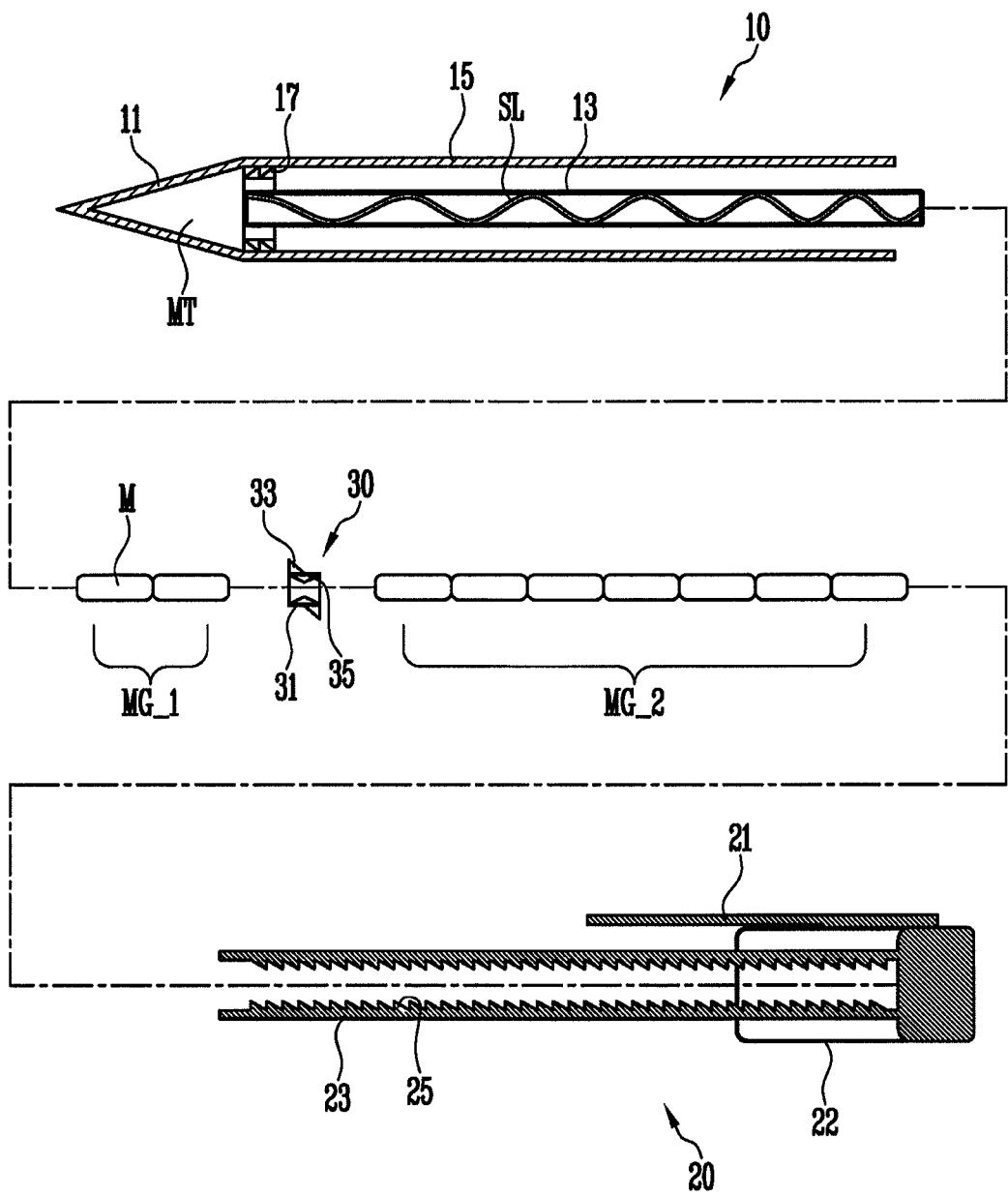
FIG. 3 is an exploded sectional view of the magnetic touch pen of FIG. 2.

Referring to FIGS. 2 and 3, the magnetic touch pen 100 further includes a magnetic power controller 30 together with the above-described first case 10 and second case 20.

The first case 10 includes a cylindrical first body 13 and a third body 15 for covering the first body 13. The second body 23 of the second case 20 is inserted between the first body 13 and the third body 15.

The first body 13 is extended in an opposite direction from the touch tip 11. A plurality of magnets M is arranged in a line in the first body 13 in the longitudinal direction of the first body 13.

Here, the magnets M are arranged so that the same pole faces the same direction of the longitudinal direction of the first body 13.

In addition, the plurality of magnets M are divided into two groups and the two groups of magnets MG_1 and MG_2 are separated from each other by a predetermined distance by the magnetic power controller 30.

The magnets M as metal permanent magnets of a uniform size may be cylindrical. The kinds of the magnets and the number of magnets may vary as occasion demands and the present invention is not limited to the above.

A rubber magnet MT that is a magnetic material may be mounted in the touch tip 11.

A sliding line SL for guiding the movement of the magnetic power controller 30 is formed in the first body 13.

The sliding line SL may be a straight line or a curved line formed in the longitudinal direction of the first body 13 and the wall of the first body 13 is removed so that the inside and the outside thereof are opened.

In the sliding line SL, the screw thread protrusions 33 of the magnetic power controller 30 described later pass through the sliding line SL to protrude to the outside of the first body 13. The sliding lines SL may be formed to correspond to the number of screw thread protrusions 33 and the positions of the screw thread protrusions 33.

The second case 20 includes a second body 23 in which the first body 13 is accommodated. Screw threads 25 are formed on the inner circumference of the second body 23.

The second body 23 is extended from the end of the second case 20 and has a diameter larger than that of the first body 13 so that the first body 13 may be accommodated therein. The length and shape of the second body 23 may be the same as those of the first body 13.

Both ends of the second body 23 are fastened to both ends of the first case 10 so that the second body 23 may independently rotate in the state where the second body 23 is combined with the first case 10. For this purpose, the first case 10 may further include a fastening unit 17.

The screw thread protrusions 33 of the magnetic power controller 30 are inserted into the screw threads 25 formed on the inner circumference of the second body 23. The magnetic power controller 30 rotates along the screw threads 25 to move in the longitudinal direction of the body.

The magnetic power controller 30 is provided between the magnets MG_1 and MG_2 divided into two groups so that the two groups of magnets MG_1 and MG_2 are separated from each other and moves along the screw threads 25 of the second case 20 to control the number of magnets MG_1 and MG_2 that belong to the two groups.

A first group of magnets MG_1 positioned on the side of the touch tip 11 directly affects magnetic power sensed by a touch screen panel (not shown) and the second group of magnets MG_2 positioned on the opposite side are less influential.

Because the magnets M arranged in the first body 13 are substantially aligned in one direction in the longitudinal direction, magnetic flux density is concentrated on the touch tip 11 region and the magnetic flux density in the touch tip 11 region changes in accordance with the number of magnets MG_1 included in the first group adjacent to the touch tip 11.

For example, when the user rotates the second case 20 of the touch pen in a clockwise direction or in a counter-clockwise direction, the magnetic power controller 30 is controlled to move upward/downward along the screw threads 25 in the second case 20 and the magnets are separated from each other so that the magnetic power may be controlled.

At this time, the controlled magnets are attached to adjacent magnets by gravitation and a fixed part may be maintained. Although gravitation is generated between the magnets separated from each other, the distance between the magnets is substantially maintained by the magnetic power controller 30.

In some embodiments, the magnets M may be cut so that the edges thereof form low angles and the magnets M may be easily separated by the magnetic power controller 30. In accordance with the material of the magnetic power controller 30, the side surfaces of the magnets M may be processed to be screw thread-shaped as occasion demands.

The detailed structure of the magnetic controller 30 will be described with reference to FIG. 4A.

Figure 4A:
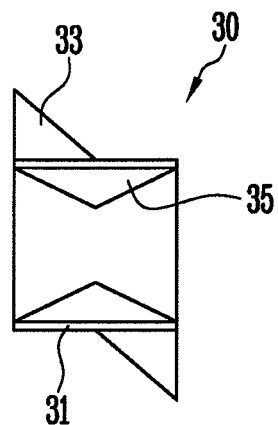
FIGS. 4A and 4B are sectional views illustrating embodiments of a magnetic power controller.
Figure 4B:
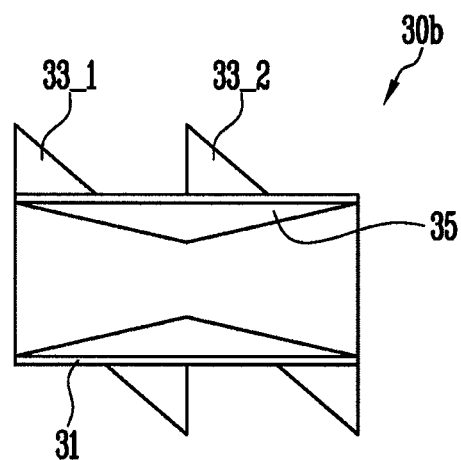
Figure 5A:
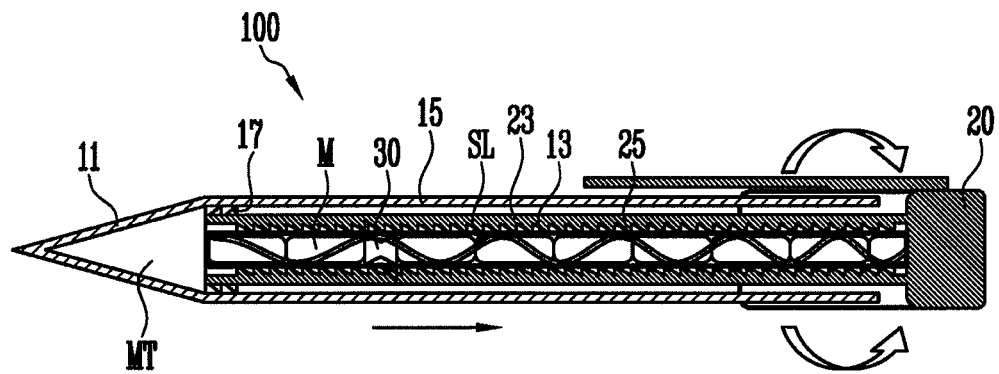
FIGS. 5A to 5C are sectional views illustrating magnetic power control of the magnetic touch pen.
Figure 5B:
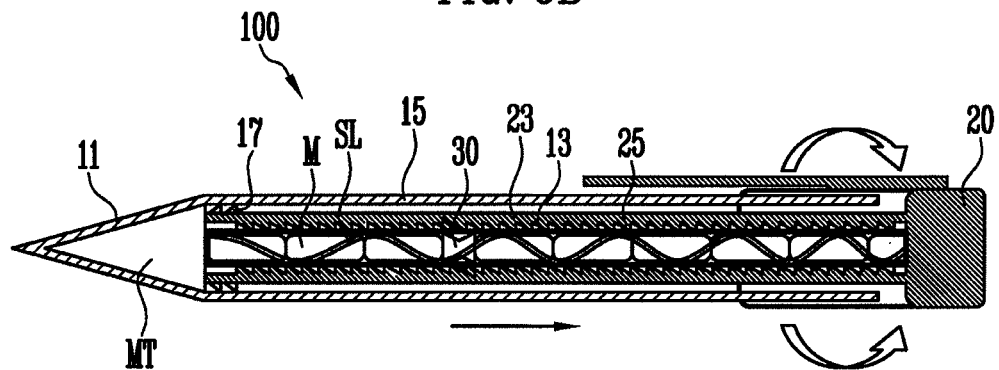
Figure 5C:
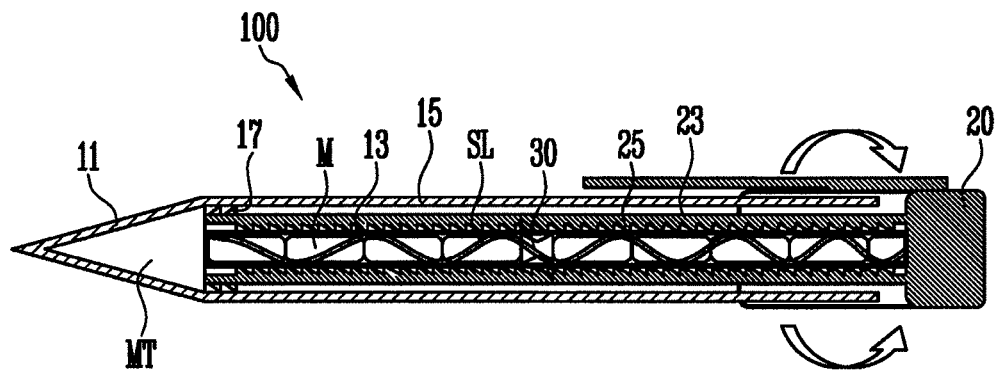

FIGS. 4A and 4B are sectional views illustrating embodiments of a magnetic power controller. FIGS. 5A to 5C are sectional views illustrating magnetic power control of the magnetic touch pen.

Referring to FIG. 4A, the magnetic power controller 30 may include controlling bodies 31, screw thread protrusions 33, and locking jaws 35.

The controlling bodies 31 are cylindrical rings having a diameter through which the magnets M may pass. Since the controlling bodies 31 are provided in the first body 13 to frequently move among the magnets M, the controlling bodies 31 may be strong and may have a thickness as small as possible.

The screw thread protrusions 33 are formed on the outer circumferences of the controlling bodies 31 to protrude and pass through the sliding line SL of the first body 13 to be inserted into the screw threads 250 of the second body 23.

As another embodiment, as illustrated in FIG. 4B, a plurality of screw thread protrusions 33_1 and 33_2 may be formed on the outer circumferences of the controlling bodies 31.

The locking jaws 35 are formed on the inner circumferences of the controlling bodies 31 to prevent the magnets M from flowing and are formed of a ductile material including at least one of urethane and plastic.

The two groups of magnets MG_1 and MG_2 separated from each other by the locking jaws 35 with the magnetic power controller 30 interposed remain separated from each other. However, when the magnetic power controller 30 moves by rotation, the locking jaws 35 formed of the ductile material are deformed by pressure to pass through the magnets M and the original shape of the locking jaws 35 is restored in the gap of the magnets M so that the locking jaws 35 remain separated from each other.

The locking jaws 35 may be triangular so that the shape thereof may be easily restored in the gap of the magnets M.

Referring to FIGS. 5A to 5C, the magnetic power controller 30 may be moved in the longitudinal direction by the relative rotations of the first case 10 and the second case 20. In FIG. 5A, when the magnetic power controller 30 crosses the boundary between the magnets, the magnets are separated by the restoration of the shape of the locking jaws 35 and stronger gravitation is generated in the direction where the magnetic power controller 30 is originally positioned so that the magnets that pass through the magnetic power controller 30 are moved to the first group MG_1 and are attached as illustrated in FIG. 5B.

When the touch pen is continuously rotated in one direction, the magnets may be sequentially moved as illustrated in FIG. 5C. When the touch pen is rotated in the opposite direction, the magnets that belong to the first group MG_1 may be separated from each other.

As described above, according to the described technology, the magnets in which the magnetic power controller 30 is mounted are divided into the two groups MG_1 and MG_2 so that the magnitude of the magnetic power of the touch pen may be controlled and that a plurality of touch modes in accordance with levels of the magnetic power may be provided.

In addition, since the magnets are arranged in the longitudinal direction, touch inputs of various methods may be performed using the side surfaces of the touch pen.

For example, the thickness or kind of a line drawn by the touch pen and display brightness and color may vary with the level of the magnetic power. In addition, in accordance with the level of the magnetic power, special functions such as multi-touch activation, screen on/off, and drag and drop may be added.

In addition, operations such as expansion/contraction, rotation, and screen capture may be recognized by laying the touch pen on a touch screen.

The above use examples mean that the touch screen panel may realize various functions by previously setting options in accordance with the levels of the magnetic power of the touch pen.

While the above embodiments have been described in connection with the accompanying drawings, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A magnetic touch pen, comprising:
   a first case in which a plurality of magnets are arranged in a cylindrical first body in a longitudinal direction of the first body;
   a second case comprising a second body in which the first body of the first case is accommodated, wherein the second case comprises screw threads formed on an inner circumference of the second body; and
   a magnetic power controller provided between two groups of magnets to separate the two magnet groups, wherein the magnetic power controller is configured to move along the screw threads of the second case to control a plurality of magnets of the magnet groups.

2. The magnetic touch pen as claimed in claim 1, wherein a sliding line for guiding movement of the magnetic power controller is formed in the first body of the first case.

3. The magnetic touch pen as claimed in claim 2, wherein the magnetic power controller comprises a plurality of screw thread protrusions that pass through the sliding line to protrude outside the second body and that are combined with the screw threads of the second body.

4. The magnetic touch pen as claimed in claim 3, wherein the magnetic power controller comprises:
   a plurality of cylindrical controlling bodies having a diameter through which the magnets are configured to pass; and
   a plurality of locking jaws formed of a ductile material formed on inner circumferences of the controlling bodies to prevent the magnets from flowing.

5. The magnetic touch pen as claimed in claim 4, wherein the locking jaws comprise at least one of urethane and plastic.

6. The magnetic touch pen as claimed in claim 3, wherein the screw thread protrusions are formed on outer circumferences of the controlling bodies.

7. The magnetic touch pen as claimed in claim 2, wherein the sliding line is a straight line or a curved line formed in the longitudinal direction of the first body.

8. The magnetic touch pen as claimed in claim 1, wherein the first case comprises a third body that covers the first body, and wherein the second body of the second case is inserted between the first body and the third body.

9. The magnetic touch pen as claimed in claim 8, wherein both ends of the second body of the second case are fastened to both ends of the first case.

10. The magnetic touch pen as claimed in claim 9, wherein the second case comprises a grip extended to a part of an outer circumference of the third body while covering an end of the first case to provide a turning handle region of a user.

11. The magnetic touch pen as claimed in claim 1, wherein the first case comprises a touch tip in which a magnetic material is mounted.

12. The magnetic touch pen as claimed in claim 1, wherein the magnets are cylindrical.

13. The magnetic touch pen as claimed in claim 1, wherein the magnets comprise edges configured to form low angles.

* * * * *

UNITED STATES PATENT AND TRADEMARK OFFICE
CERTIFICATE OF CORRECTION

PATENT NO. : 8,928,636 B2  
APPLICATION NO. : 13/758507  
DATED : January 6, 2015  
INVENTOR(S) : Hyung-Sung Bang et al.

It is certified that error appears in the above-identified patent and that said Letters Patent is hereby corrected as shown below:

In the specification

In column 5 at line 57, Change "MG 2" to --MG_2--.

Signed and Sealed this
Seventeenth Day of November, 2015

Michelle K. Lee
*Director of the United States Patent and Trademark Office*